(12) United States Patent
Choi et al.

(10) Patent No.: US 8,184,725 B2
(45) Date of Patent: May 22, 2012

(54) RECEIVER AND METHOD FOR IMPLEMENTING TIMING SYNCHRONIZATION IN OFDM SCHEME

(75) Inventors: Eoi Young Choi, Yongin-si (KR); Joon Hyun Sung, Yongin-si (KR); Kwang Chul Kim, Yongin-si (KR); Jeong Taek Lee, Yongin-si (KR)

(73) Assignee: Samsung Electronics Co., Ltd., Suwon-si (KR)

( * ) Notice: Subject to any disclaimer, the term of this patent is extended or adjusted under 35 U.S.C. 154(b) by 882 days.

(21) Appl. No.: 11/674,427

(22) Filed: Feb. 13, 2007

(65) Prior Publication Data

US 2008/0101486 A1 May 1, 2008

(30) Foreign Application Priority Data

Oct. 31, 2006 (KR) .................. 10-2006-0106813

(51) Int. Cl.
*H04L 27/28* (2006.01)
(52) U.S. Cl. ......... 375/260; 375/316; 375/340; 370/208
(58) Field of Classification Search .................. 375/260, 375/316, 354, 340; 370/208
See application file for complete search history.

(56) References Cited

U.S. PATENT DOCUMENTS

| 7,194,055 | B2 | 3/2007 | Tandai et al. |
| 7,313,085 | B2 | 12/2007 | Kim |
| 2003/0090994 | A1 | 5/2003 | Kakura |
| 2004/0005022 | A1 | 1/2004 | Zhu et al. |
| 2005/0063298 | A1* | 3/2005 | Ling et al. ................ 370/208 |
| 2006/0098766 | A1* | 5/2006 | Pietraski et al. ........... 375/346 |
| 2006/0104332 | A1 | 5/2006 | Deng et al. |
| 2006/0176802 | A1* | 8/2006 | Ko et al. ................... 370/208 |
| 2007/0280098 | A1* | 12/2007 | Bhatt et al. ................ 370/208 |

FOREIGN PATENT DOCUMENTS

| EP | 0 798 903 | 10/1997 |
| JP | 09-321733 | 12/1997 |
| JP | 11-032027 | 2/1999 |
| JP | 2001-69119 | 3/2001 |
| JP | 2001-513599 B | 9/2001 |

(Continued)

OTHER PUBLICATIONS

Decision to Grant issued Apr. 2, 2008 by the Korean Intellectual Property Office re: Korean Patent Application No. 20056-106813 (2 pp).

(Continued)

*Primary Examiner* — Chieh M. Fan
*Assistant Examiner* — Leila Malek
(74) *Attorney, Agent, or Firm* — NSIP Law (57) ABSTRACT

A receiver and method of performing timing synchronization in an orthogonal frequency division multiplexing (OFDM) scheme. A receiver to perform timing synchronization in an OFDM scheme, the receiver including: an autocorrelation processor to calculate and accumulate an autocorrelation value with regard to samples of an OFDM symbol before an initialized starting point; and a reference value calculator to calculate the reference value of each sample index in at least one predetermined sample section, based on the accumulated autocorrelation values, wherein the reference value corresponds to a value dividing an imaginary number unit of the accumulated autocorrelation values into a real number unit, and is used to repeatedly reestablish the initialized starting point and to determine the final starting point.

19 Claims, 4 Drawing Sheets

FOREIGN PATENT DOCUMENTS

| | | |
|---|---|---|
| JP | 2003-152670 | 5/2003 |
| JP | 2003-304219 | 10/2003 |
| JP | 2005-064615 | 3/2005 |
| JP | 2008-544591 A | 12/2008 |
| KR | 2002-89793 | 11/2002 |
| KR | 2003-6016 | 1/2003 |
| KR | 2003-16121 | 2/2003 |
| KR | 2005-66270 | 6/2005 |
| KR | 2006-38685 | 5/2006 |
| KR | 2006-66877 | 6/2006 |
| WO | WO 99/08427 | 2/1999 |
| WO | WO 2006/099532 | 9/2006 |

OTHER PUBLICATIONS

Search Report issued on Nov. 11, 2007 by the European Patent Office for European Patent Application No. 07103079.5-1237.

Muller-Weinfurtner "On the Optimality of Metrics for Coarse Frame Synchronization in OFDM: A Comparison" The Ninth IEEE International Symposium on Personal, Indoor and Mobile Radio Communication, vol. 2, Sep. 1998 pp. 533-537.

Rohit et al. "Blind OFDM Symbol Synchronization ISI Channels." IEEE Transactions on Communications, vol. 50, No. 9, Sep. 2002 pp. 1525-1534.

European Search Report issued on Nov. 22, 2007, in corresponding European Patent Application No. 07103079.5 (10 pages).

Muller-Weinfurtner, "On the Optimality of Metrics for Coarse Frame Synchronization in OFDM: A Comparison" *The Ninth IEEE International Symposium on Personal, Indoor and Mobile Radio Communications*, Boston, MA, USA, vol. 2, Sep. 18, 1998-Sep. 11, 1998, pp. 533-537.

Rohit Negi et al., "Blind OFDM Symbol Synchronization in ISI Channels," *IEEE Transactions on Communications*, vol. 50, No. 9, Sep. 2002 pp. 1525-1534.

* cited by examiner

RECEIVER AND METHOD FOR IMPLEMENTING TIMING SYNCHRONIZATION IN OFDM SCHEME

CROSS-REFERENCE TO RELATED APPLICATIONS

This application claims the benefit of Korean Patent Application No. 2006-106813, filed on Oct. 31, 2006 in the Korean Intellectual Property Office, the disclosure of which is incorporated herein by reference.

BACKGROUND OF THE INVENTION

1. Field of the Invention

Aspects of the present invention relate to an orthogonal frequency division multiplexing (OFDM) system, and more particularly, to a receiver and method of performing timing synchronization in an OFDM scheme to determine a starting point of an OFDM symbol more accurately without being significantly affected by environmental conditions of a multi-pass channel or by an OFDM transmission scheme.

2. Description of the Related Art

Generally, an orthogonal frequency division multiplexing (OFDM) scheme efficiently transmits data via a channel and uses many sub-carrier frequencies within a channel bandwidth to transmit the data.

Consideration of timing synchronization is required in order to receive and accurately demodulate a signal transmitted from an OFDM system. Specifically, when a starting point of an OFDM symbol is not located accurately, inter-carrier interference (ICI) and inter-symbol interference (ISI) occur, and a transmission signal may not be accurately restored. Accordingly, significant research on timing synchronization has been conducted. A timing synchronization method with a preamble structure having patterns repeating before a stream including real data is generally used. The timing synchronization method accumulates an autocorrelation value between the received preambles and uses the number of the accumulated autocorrelation values. The timing synchronization method accumulates a correlation value between a preamble value, which is already known, and a received preamble value, using the number of the accumulated correlation values.

However, since performance deviation concerning timing synchronization varies significantly according to a channel environmental condition or an OFDM transmission method (for example, a cyclic shift OFDM system) in the OFDM system including timing synchronization, efforts are required to perform timing synchronization accurately in any channel environmental condition or any OFDM transmission method.

Therefore, a receiver and method of performing timing synchronization in an OFDM scheme to determine a starting point of an OFDM symbol more accurately without being significantly affected by an environmental condition of a multi-pass channel or an OFDM transmission scheme is required.

SUMMARY OF THE INVENTION

Aspects of the present invention provide a receiver and method of performing timing synchronization in an orthogonal frequency division multiplexing (OFDM) scheme to determine a starting point of an OFDM symbol more accurately without being significantly affected by an environmental condition of a multi-pass channel or an OFDM transmission scheme. The OFDM scheme calculates a reference value dividing an imaginary number unit of the autocorrelation values accumulated for each sample index into a real number unit, repeatedly reestablishes an initialized starting point of the OFDM symbol, based on the calculated reference value, and determines a final starting point of the OFDM symbol.

According to an aspect of the present invention, there is provided a receiver for performing timing synchronization in an OFDM scheme, the receiver including: an autocorrelation processor to calculate and accumulate an autocorrelation value with regard to samples of an OFDM symbol before an initialized starting point; and a reference value calculator to calculating the reference value of indexes in at least one predetermined sample section based on the accumulated autocorrelation values, wherein the reference value corresponds to the result of dividing an imaginary number unit of the accumulated autocorrelation values by a real number unit of the accumulated autocorrelation values and is used to repeatedly reestablish the initialized starting point and to determine the final starting point.

According to another aspect of the present invention, there is provided a method of performing timing synchronization of an OFDM scheme, the timing synchronization method including: calculating and accumulating an autocorrelation value with regard to samples of an OFDM symbol before an initialized starting point; and calculating a reference value of indexes in at least one predetermined sample section based on the accumulated autocorrelation values, wherein the reference value corresponds to a value dividing an imaginary number unit of the accumulated autocorrelation values into a real number unit of the accumulated autocorrelation values and is used to repeatedly reestablish the initialized starting point and to determine the final starting point.

Additional aspects and/or advantages of the invention will be set forth in part in the description which follows and, in part, will be obvious from the description, or may be learned by practice of the invention.

BRIEF DESCRIPTION OF THE DRAWINGS

The above and/or other aspects and advantages of the present invention will become apparent and more readily appreciated from the following description of the embodiments, taken in conjunction with the accompanying drawings of which.

DETAILED DESCRIPTION OF THE EMBODIMENTS

Reference will now be made in detail to the present embodiments of the present invention, examples of which are illustrated in the accompanying drawings, wherein like reference numerals refer to the like elements throughout. The embodiments are described below in order to explain the present invention by referring to the figures.

Figure 1:
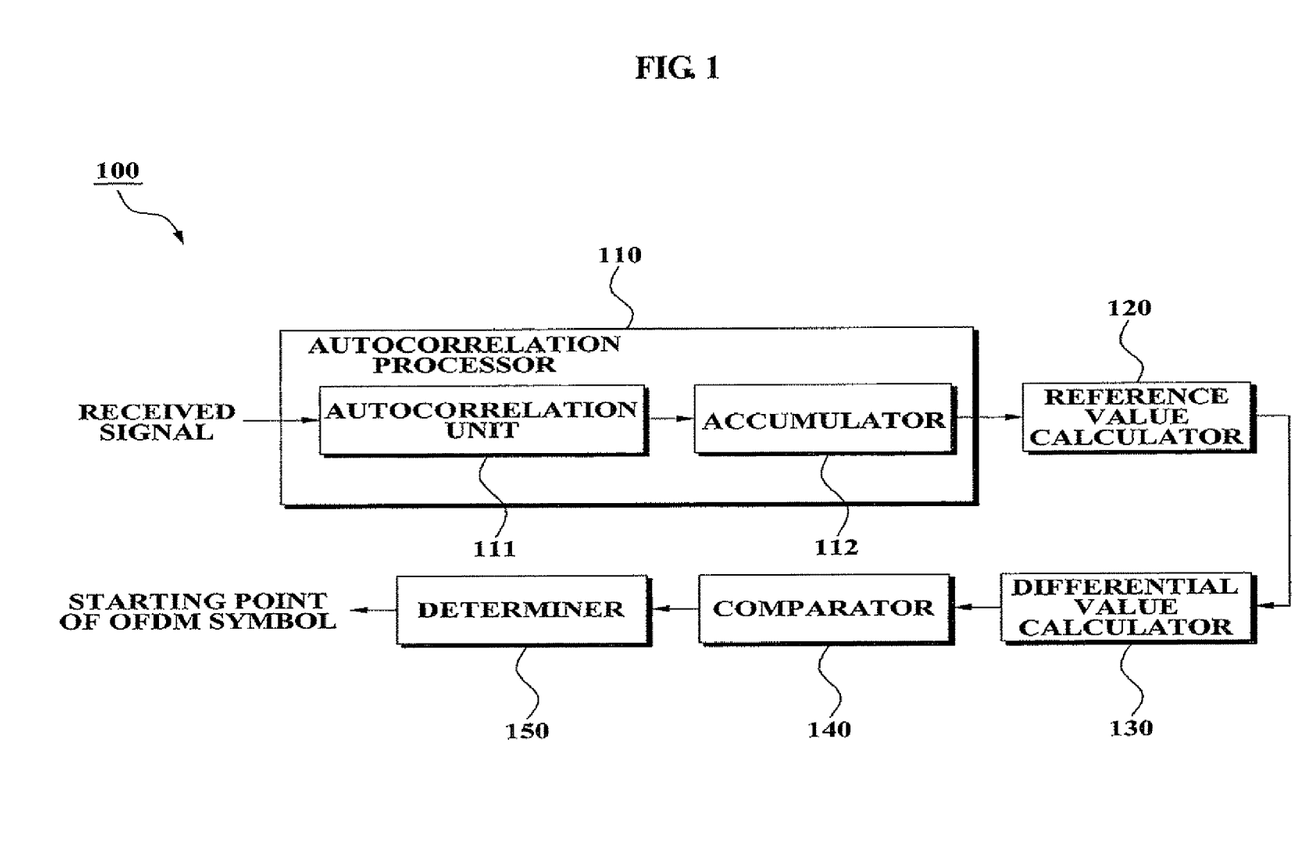
FIG. 1 is a configuration diagram illustrating a receiver for performing timing synchronization in an orthogonal frequency division multiplexing (OFDM) scheme according to an embodiment of the present invention.

FIG. 1 is a diagram illustrating a receiver 100 to perform timing synchronization in an orthogonal frequency division multiplexing (OFDM) scheme according to an embodiment of the present invention. The receiver 100 includes an autocorrelation processor 110 with an autocorrelation unit 111 and an accumulator 112, a reference value calculator 120, a differential value calculator 130, a comparator 140, and a determiner 150. In other aspects of the present invention, the receiver 100 may include additional components. Similarly, according to other aspects of the invention, the functionality of two or more of the above components may be combined into a single component.

The autocorrelation processor 110 calculates an autocorrelation value with regard to samples of an OFDM symbol before an initialized starting point in a received signal and accumulates the calculated autocorrelation value for indexes of each sample. The reference value calculator 120 calculates the reference value of each sample index in at least one predetermined sample section, based on the accumulated autocorrelation values. The differential value calculator 130 calculates and accumulates a difference between two adjacent reference values using the reference values calculated in the reference value calculator 120. The comparator 140 compares the accumulated difference values in the differential value calculator 130 with a critical value. The determiner 150 reestablishes the initialized starting point as a result of the comparing and determines the final starting point.

The at least one predetermined sample section may include different samples from the initialized starting point to a previous sample direction. For example, the at least one predetermined sample section may be established using at least one sliding window. Specifically, the at least one predetermined sample section established may correspond to a size of the at least one sliding window. A timing synchronization technique using two sliding windows according to an embodiment of the present invention will be described.

Figure 2:
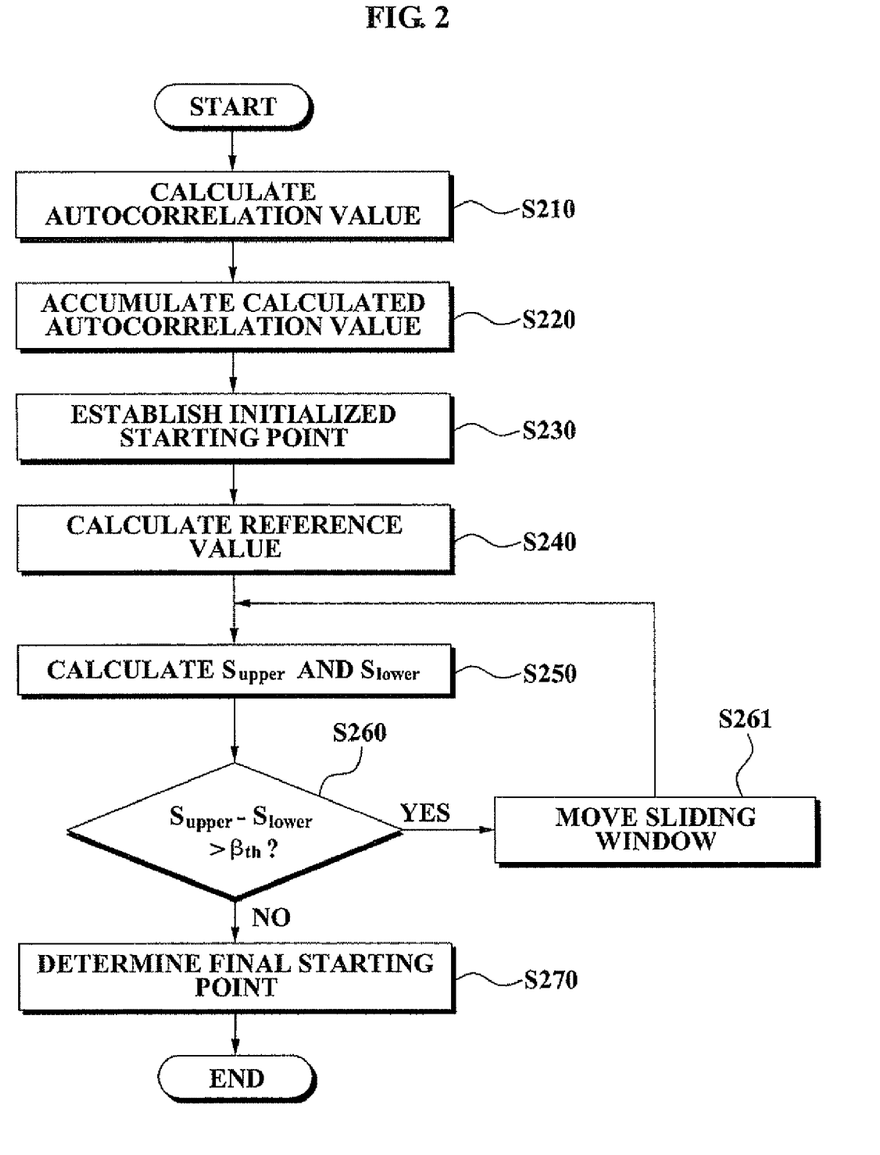
FIG. 2 is a flowchart illustrating a method of performing timing synchronization in an OFDM scheme according to an embodiment of the present invention.

A timing synchronization technique in an OFDM scheme according to an embodiment of the present invention configured as illustrated in FIG. 1 is described with reference to FIG. 2. FIG. 2 is a flowchart illustrating a timing synchronization technique in an OFDM scheme according to an embodiment of the present invention. The OFDM timing synchronization technique may include calculating an autocorrelation value (S210), accumulating the calculated autocorrelation value (S220), establishing an initialized starting point (S230), calculating a reference value (S240), calculating and accumulating a differential value (S250), comparing a difference between the accumulated differential values and a critical value (S260), moving a sliding window (S261) and determining the final starting point (S270).

A received signal r(m) received from a receiving end of the OFDM system in the OFDM system using a preamble having repetitive patterns may be shown as Equation 1.

$$r(m) = s(m-\theta) \cdot \exp(j2\pi\varepsilon m/N) + n(m) \quad \text{[Equation 1]}$$

Here, θ indicates a timing offset and ε indicates a frequency offset. N is a length of the OFDM signal and j is the square root of −1. s(m) indicates a transmitted signal and n(m) indicates a noise signal.

The autocorrelation processor 110 calculates an autocorrelation value with regard to samples of an OFDM symbol before an initialized starting point (S210) and accumulates the calculated autocorrelation value for each of the sample indexes (S220). Specifically, the autocorrelation unit 111 calculates the autocorrelation value corresponding to each of the sample indexes and the accumulator 112 accumulates the calculated autocorrelation value for each of the sample indexes.

Figure 3:
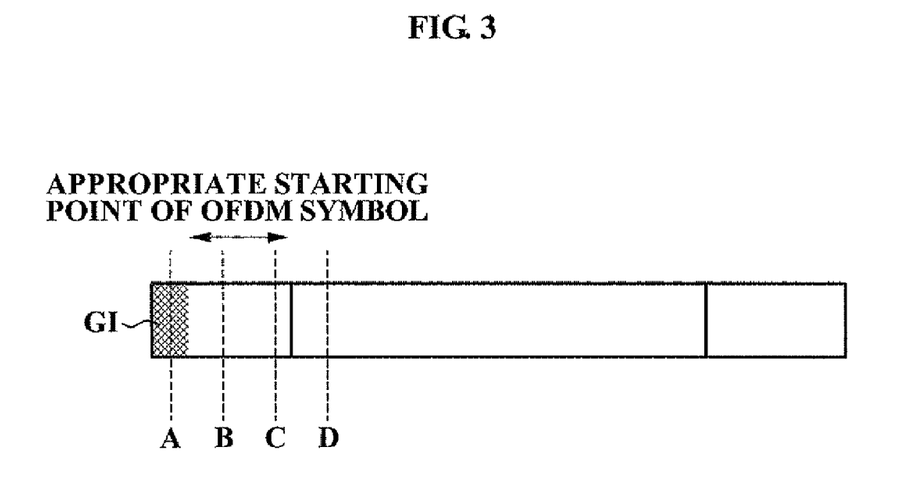
FIG. 3 is a diagram illustrating an example of an appropriate starting point of an OFDM symbol according to an embodiment of the present invention.

The determiner 150 establishes an initialized starting point from the received OFDM symbol (S230) and enables the initialized starting point to enter a guard interval (GI) area when the initialized starting point is delayed in a wide range. An appropriate starting point of OFDM symbol is described with reference to FIG. 3. FIG. 3 is a diagram illustrating an example of an appropriate starting point of an OFDM symbol according to an embodiment of the present invention.

As illustrated in FIG. 3, the starting point A of an OFDM symbol is in the GI area; however, the starting point A of the OFDM symbol is affected by a previous sample due to inter-symbol interference (ISI). The starting point D of the OFDM symbol corresponds to a case where incorrect timing synchronization is performed, causing inter-carrier interference (ICI) and ISI. In this case, the starting point B of the OFDM symbol is the inaccurate starting point; however, the starting point B of the OFDM symbol may be ensured by the GI. The starting point D of OFDM symbol then corresponds to a case where accurate timing synchronization is performed.

The determiner 150 may establish two sliding windows of a predetermined size including different samples from the initialized starting point to a previous sample direction in the received signal.

Figure 4:
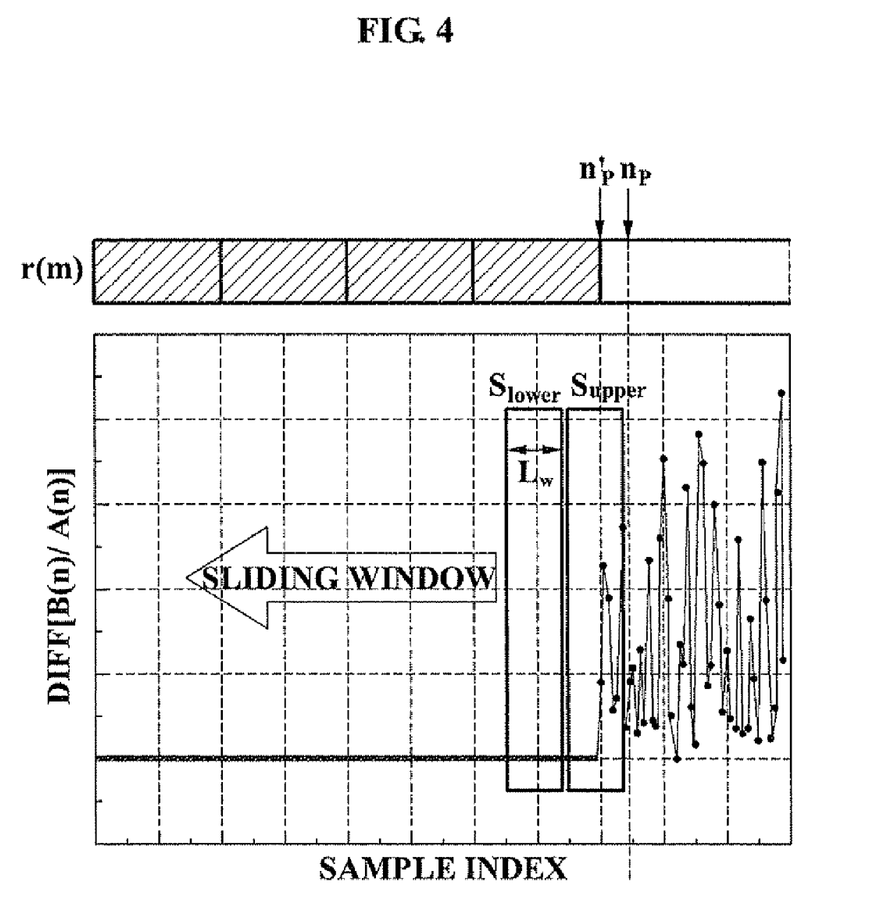
FIG. 4 is a diagram illustrating an example of an operation principle of performing timing synchronization according to an embodiment of the present invention.

FIG. 4 is a diagram illustrating an example of performing timing synchronization using the two established sliding windows according to an embodiment of the present invention. The receiver 100 may sequentially establish two sliding windows, i.e., a first sliding window $S_{upper}$ and a second sliding window $S_{lower}$, from the initialized starting point. A size $L_w$ of the two sliding windows may be established according to various methods of establishing the initialized starting point of the OFDM symbol.

For example, if the length of an OFDM signal is N, and two identically configured blocks are transmitted, it is assumed that a received signal corresponding to a second block is r(m−N), and a received signal corresponding to a first block is r(m). It is assumed that a sample index of the received signal in the first block is 0 to N−1, and a sample index of the received signal in the second block is N to 2N−1. When there is no noise, the value which the received signal r(m) to N≤n≤2N−1, and r(m−N) spaced as much as N included in a repetitive section are autocorrelated and accumulated may be shown as Equation 2.

$$A(n) = \sum_{m=0}^{n-1} r^*(m) \cdot r(m-N) \quad \text{[Equation 2]}$$

$$= \sum_{m=0}^{n-1} |s(m-\theta)|^2 \cdot \exp(-j2\pi\varepsilon)$$

$$= \exp(-j2\pi\varepsilon) \cdot \sum_{m}^{n-1} |s(m-\theta)|^2$$

$$= A(n) + jB(n),$$

$$\varepsilon = \tan^{-1}[B(n)/A(n)]$$

Since ε is constant, a tan [B(n)/A(n)] is constant regardless of n. Also, since an a tan function is a monotone increasing function, B(n)/A(n) is also constant regardless of n. Accordingly, a differential value of B(n)/A(n) in an identical repetitive section may correspond to 0 regardless of a frequency offset and n.

However, since Equation 2 is not generated at a point in time when r(m) leaves the identical repetitive section, i.e. m≧2N, B(n)/A(n) may vary, and the differential value of B(n)/A(n) may also vary.

Using the above principle, the reference value calculator 120 calculates the reference value of each sample index in each of two sliding windows based on the accumulated autocorrelation values (S240). Here, the reference value indicates a value B(n)/A(n) obtained by dividing an imaginary number unit of the accumulated autocorrelation values, B(n), by a real number unit of the accumulated autocorrelation values, A(n).

For example, a first calculator in the reference calculator 120 may calculate the first reference value of each sample index in the first sliding window of the two sliding windows. A second calculator in the reference calculator may calculate the second reference value of each sample index in the second sliding window of the two sliding windows.

The differential value calculator 130 calculates and accumulates a difference between two adjacent reference values using the reference values calculated in the reference value calculator 120 in each of the two sliding windows. The differential values of the reference value with respect to the two sliding windows may be shown as Equation 3.

$$S_{upper}(n_p) = \sum_{n=n_p-L_W}^{n_p-1} diff(n)$$

$$S_{lower}(n_p) = \sum_{n=n_p-2L_W}^{n_p-1-L_W} diff(n)$$

$$diff(n) = \frac{B(n)}{A(n)} - \frac{B(n-1)}{A(n-1)}$$

[Equation 3]

For example, a third calculator in the differential value calculator 130 may calculate and accumulate a difference between two adjacent reference values using the reference values calculated in the first calculator A fourth calculator in the differential value calculator 130 may calculate and accumulate a difference between two adjacent reference values using the reference values calculated in the second calculator.

The comparator 140 compares a difference between the accumulated difference values corresponding to the two sliding windows in the differential value calculator 130 and a critical value $\beta_{th}$ (S260). This is shown as Equation 4.

$$S_{upper} - S_{lower} > \beta_{th}$$ [Equation 4]

Since the differential value of the reference value has a large value when the initialized starting point $n_p$ is spaced far away from 2N, the first sliding window $S_{upper}$ has a value significantly greater than the second sliding window $S_{lower}$.

Conversely, since the differential value of the reference value approaches a small value, i.e., 0, when the initialized starting point $n_p$ becomes less than 2N, the difference between the first sliding window $S_{upper}$ and the second sliding window $S_{lower}$ decreases.

The determiner 150 reestablishes the initialized starting point as a result of the comparing and determines the final starting point (S270). Specifically, the determiner 150 determines the initialized starting point as the final starting point when a difference between the accumulated difference values is less than the critical value $\beta_{th}$.

When the difference between the accumulated difference values is greater than or equal to the critical value, the determiner 150 may determine a location where a predetermined sample is moved as the final starting point $n'_p$ by repeatedly moving the sliding window from the initialized starting point to the previous sample direction at predetermined sample intervals (S261) until the difference between the accumulated difference values is less than the critical value $\beta_{th}$.

Aspects of the present invention include computer-readable media including program instructions to implement various operations embodied by a computer. The media may also include, alone or in combination with the program instructions, data files, data structures, and the like. The media and program instructions may be those specially designed and constructed for the purposes of the present invention, or they may be of the kind well-known and available to those having skill in the computer software arts. Examples of computer-readable media include magnetic media such as hard disks, floppy disks, and magnetic tape; optical media such as CD ROM disks and DVD; magneto-optical media such as optical disks; and hardware devices that are specially configured to store and perform program instructions, such as read-only memory (ROM), random access memory (RAM), flash memory, and the like. Examples of program instructions include both machine code, such as produced by a compiler, and files containing higher level code that may be executed by the computer using an interpreter. The described hardware devices may be configured to act as one or more software modules in order to perform the operations of the above-described embodiments of the present invention.

According to aspects of the present invention, there is provided a receiver and method of performing timing synchronization in an OFDM scheme including a preamble having repetitive patterns, which can calculate a reference value dividing an imaginary number unit of the autocorrelation values accumulated for each sample index into a real number unit, repeatedly reestablish the initialized starting point of OFDM symbol, based on the calculated reference value, and determine the final starting point of OFDM symbol. Therefore, the starting point of OFDM symbol can be determined more accurately without being significantly affected by an environmental condition of a multi-pass channel or a particular OFDM transmission scheme.

Although a few embodiments of the present invention have been shown and described, it would be appreciated by those skilled in the art that changes may be made to this embodiment without departing from the principles and spirit of the invention, the scope of which is defined in the claims and their equivalents.

What is claimed is:

1. A receiver of an orthogonal frequency division multiplexing (OFDM) scheme, the receiver comprising:
   an autocorrelation processor to calculate and accumulate an autocorrelation value with regard to samples of an OFDM symbol before an initialized starting point; and
   a reference value calculator to calculate reference values of indexes of each sample in at least one predetermined sample section based on the accumulated autocorrelation values, the at least one predetermined sample section established using at least one sliding window and corresponding to a size of the at least one sliding window;
   wherein the reference values correspond to the result of dividing an imaginary number unit of the accumulated autocorrelation values by a real number unit of the accumulated autocorrelation values and are used to repeatedly reestablish the initialized starting point and to determine a final starting point.

2. The receiver according to claim 1, wherein the at least one predetermined sample section comprises different samples from the initialized starting point to a previous sample direction.

3. The receiver according to claim 1, wherein the autocorrelation processor comprises:
an autocorrelation unit to calculate the autocorrelation value corresponding to each of the sample indexes; and
an accumulator to accumulate the calculated autocorrelation value for each of the sample indexes.

4. A receiver of an orthogonal frequency division multiplexing (OFDM) scheme, the receiver comprising:
an autocorrelation processor to calculate and accumulate an autocorrelation value with regard to samples of an OFDM symbol before an initialized starting point;
a reference value calculator to calculate reference values of indexes of each sample in at least one predetermined sample section based on the accumulated autocorrelation values; and
a differential value calculator to calculate and accumulate a difference between two adjacent reference values using the reference values calculated in the reference value calculator;
wherein the reference values correspond to the result of dividing an imaginary number unit of the accumulated autocorrelation values by a real number unit of the accumulated autocorrelation values and are used to repeatedly reestablish the initialized starting point and to determine a final starting point.

5. The receiver according to claim 4 further comprising:
a comparator to compare the accumulated difference values in the differential value calculator with a critical value; and
a determiner to reestablish the initialized starting point as a result of the comparing and to determine the final starting point,
wherein the critical value is a predetermined threshold value.

6. The receiver according to claim 5, wherein the determiner:
determines the initialized starting point as the final starting point when the accumulated difference values are less than the critical value; and
when the accumulated difference values are greater than or equal to the critical value, determines a location where a predetermined sample is moved as the final starting point by repeatedly moving from the initialized starting point to the previous sample direction at predetermined sample intervals until the accumulated difference values are less than the critical value.

7. The receiver according to claim 1, wherein the OFDM scheme comprises a preamble having repetitive patterns.

8. A timing synchronization method of a receiver in an orthogonal frequency division multiplexing (OFDM) system, the timing synchronization method comprising:
calculating and accumulating, by an autocorrelation processor, an autocorrelation value with regard to samples of an OFDM symbol before an initialized starting point; and
calculating reference values of indexes of each sample in at least one predetermined sample section based on the accumulated autocorrelation values, the at least one predetermined sample section established using at least one sliding window and corresponding to a size of the at least one sliding window;
wherein the reference values correspond to the result of dividing an imaginary number unit of the accumulated autocorrelation values by a real number unit of the accumulated autocorrelation values and are used to repeatedly reestablish the initialized starting point and to determine a final starting point.

9. The timing synchronization method according to claim 8, wherein the at least one predetermined sample section comprises different samples from the initialized starting point to a previous sample direction.

10. The timing synchronization method according to claim 8, wherein the calculating and the accumulating of the autocorrelation value comprises:
calculating the autocorrelation value corresponding to each of the sample indexes; and
accumulating the calculated autocorrelation value for each of the sample indexes.

11. A timing synchronization method of a receiver in an orthogonal frequency division multiplexing (OFDM) system, the timing synchronization method comprising:
calculating and accumulating, by an autocorrelation processor, an autocorrelation value with regard to samples of an OFDM symbol before an initialized starting point;
calculating reference values of indexes of each sample in at least one predetermined sample section based on the accumulated autocorrelation values; and
calculating and accumulating a difference between two adjacent reference values using the reference values calculated in the reference value calculator;
wherein the reference values correspond to the result of dividing an imaginary number unit of the accumulated autocorrelation values by a real number unit of the accumulated autocorrelation values and are used to repeatedly reestablish the initialized starting point and to determine a final starting point.

12. The timing synchronization method according to claim 11 further comprising:
comparing the accumulated difference values and a critical value;
reestablishing the initialized starting point as a result of the comparing; and
determining the final starting point,
wherein the critical value is a predetermined threshold value.

13. The timing synchronization method according to claim 12, wherein the determining comprises:
determining the initialized starting point as the final starting point when the accumulated difference values are less than the critical value; and
determining a location where a predetermined sample is moved as the final starting point by repeatedly moving from the initialized starting point to the previous sample direction at predetermined sample intervals until the accumulated difference values are less than the critical value, when the accumulated difference values are greater than or equal to the critical value.

14. The timing synchronization method according to claim 8, wherein the OFDM scheme comprises a preamble having repetitive patterns.

15. A non-transitory computer-readable recording medium storing a program for implementing the method of claim 8.

16. A method of timing synchronization of a receiver in an orthogonal frequency division multiplexing (OFDM) scheme, the method comprising:
establishing an initial starting point;
establishing a plurality of sliding windows based on the initial starting point;
calculating, by a reference value calculator processor, reference values for indexes of each of a plurality of samples of an OFDM symbol in at least one of the plurality of sliding windows based on accumulated autocorrelation values of the plurality of samples;

calculating, for each sliding window, a sum of the difference between two adjacent reference values;

comparing the calculated sums of the plurality of sliding windows; and determining a final starting point based on the comparison.

17. The method of claim 16, wherein the determining determines the final starting point to be the initial starting point if the difference of the calculated sums of the plurality of sliding windows is within a critical value, wherein the critical value is a predetermined threshold value.

18. The method of claim 16, further comprising:

shifting the plurality of sliding windows by a predetermined amount if the difference between the calculated sums is greater than a critical value; and repeating the calculating and comparing using the shifted sliding windows, wherein the critical value is a predetermined threshold value.

19. The method according to claim 16, wherein:

the plurality of sliding windows comprise two sliding windows, $S_{upper}$ and $S_{lower}$; and the calculating, for each sliding window, the sums of the differences between two adjacent reference values comprises calculating the following sums:

$$S_{upper}(n_p) = \sum_{n=n_p-L_W}^{n_p-1} \mathit{diff}(n)$$

$$S_{lower}(n_p) = \sum_{n=n_p-2L_W}^{n_p-1-L_W} \mathit{diff}(n)$$

$$\mathit{diff}(n) = \frac{B(n)}{A(n)} - \frac{B(n-1)}{A(n-1)}$$

wherein $n_p$ is the initial starting point, $L_w$ is a size of the sliding windows, and $B(n)/A(n)$ is the reference value.

* * * * *